United States Patent
Su et al.

(10) Patent No.: US 12,025,837 B2
(45) Date of Patent: Jul. 2, 2024

(54) OPTICAL MODULE FOR BI-DIRECTIONAL MONOCHROMATIC TRANSMISSION

(71) Applicant: BROWAVE CORPORATION, Hsinchu County (TW)

(72) Inventors: Hsiu-Wei Su, Tainan (TW); Chang-Yi Peng, Taoyuan (TW)

(73) Assignee: BROWAVE CORPORATION, Hsinchu County (TW)

( * ) Notice: Subject to any disclaimer, the term of this patent is extended or adjusted under 35 U.S.C. 154(b) by 84 days.

(21) Appl. No.: 17/880,972

(22) Filed: Aug. 4, 2022

(65) Prior Publication Data
US 2024/0045145 A1    Feb. 8, 2024

(51) Int. Cl.
*G02B 6/293*    (2006.01)
*G02B 6/27*    (2006.01)
*H04B 10/25*    (2013.01)

(52) U.S. Cl.
CPC ......... *G02B 6/2938* (2013.01); *G02B 6/2746* (2013.01); *H04B 10/25891* (2020.05)

(58) Field of Classification Search
CPC ............ H04B 10/25891; G02B 6/2938; G02B 6/2746
USPC .......................................................... 398/43
See application file for complete search history.

(56) References Cited

U.S. PATENT DOCUMENTS

| | | | | |
|---|---|---|---|---|
| 11,683,095 B1 * | 6/2023 | Huang | .................... | H04B 10/40 398/139 |
| 2005/0180755 A1 * | 8/2005 | Masahiko | .............. | H04B 10/40 398/135 |
| 2016/0170146 A1 * | 6/2016 | Kurokawa | ............. | G02B 6/425 385/14 |
| 2018/0329146 A1 * | 11/2018 | Dannenberg | ....... | G02B 6/29367 |
| 2019/0052362 A1 * | 2/2019 | Peterson | ............. | G02B 27/0961 |
| 2020/0014484 A1 * | 1/2020 | Chen | ................ | H04B 10/2589 |
| 2020/0204260 A1 * | 6/2020 | Wang | ................... | G02B 6/4246 |
| 2022/0014272 A1 * | 1/2022 | Shin | ....................... | H04B 10/40 |
| 2023/0258887 A1 * | 8/2023 | Jiang | .................... | G02B 6/4251 385/89 |

FOREIGN PATENT DOCUMENTS

| | | |
|---|---|---|
| CN | 110912610 A | 3/2020 |
| CN | 111399142 A | 7/2020 |

(Continued)

*Primary Examiner* — Dalzid E Singh
(74) *Attorney, Agent, or Firm* — MUNCY, GEISSLER, OLDS & LOWE, P.C.

(57) ABSTRACT

An optical module for bi-directional monochromatic transmission is provided. The optical module includes a substrate, a common terminal, a circulator module, a multiplex-demultiplex (MDM) module, and an input-output terminal. The common terminal is adjacent to the substrate and connected to an optical fiber. The circulator module is on the substrate and in free space optical communication with the common terminal The MDM module is on the substrate and in free space optical communication with the circulator. The input-output terminal is on the substrate and in free space optical communication with the MDM module, the input-output terminal being configured to connect to an emitter and a receiver. The circulator is configured to spatially separate a first directional transmission to the MDM module from a second directional transmission from the MDM module.

20 Claims, 12 Drawing Sheets

(56) References Cited

FOREIGN PATENT DOCUMENTS

| | | |
|---|---|---|
| CN | 108833016 B | 9/2020 |
| CN | 112180521 A | 1/2021 |
| CN | 113848613 A | 12/2021 |
| CN | 215340421 U | 12/2021 |
| KR | 1020200059356 A | 5/2020 |
| TW | M575117 U | 3/2019 |

* cited by examiner

OPTICAL MODULE FOR BI-DIRECTIONAL MONOCHROMATIC TRANSMISSION

FIELD

The present disclosure relates to an optical module, particularly, the optical module is for bi-directional monochromatic transmission and including a circulator therein.

BACKGROUND

A multiplexer is an optical route that accepts many inputs but gives only one output, whereas demultiplexer functions exactly in the reverse way of a multiplexer i.e., a demultiplexer accepts only one input and gives many outputs. To be more detailed, wavelength-division multiplexing (WDM) is a technology that multiplexes (e.g., adds) a number of distinct wavelengths of light onto a single output and/or demultiplexes (e.g., divides) a number of distinct wavelengths of light from a single input, thereby increasing information capacity and enabling the bi-directional flow of signals.

BRIEF DESCRIPTION OF THE DRAWINGS

Aspects of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1A:
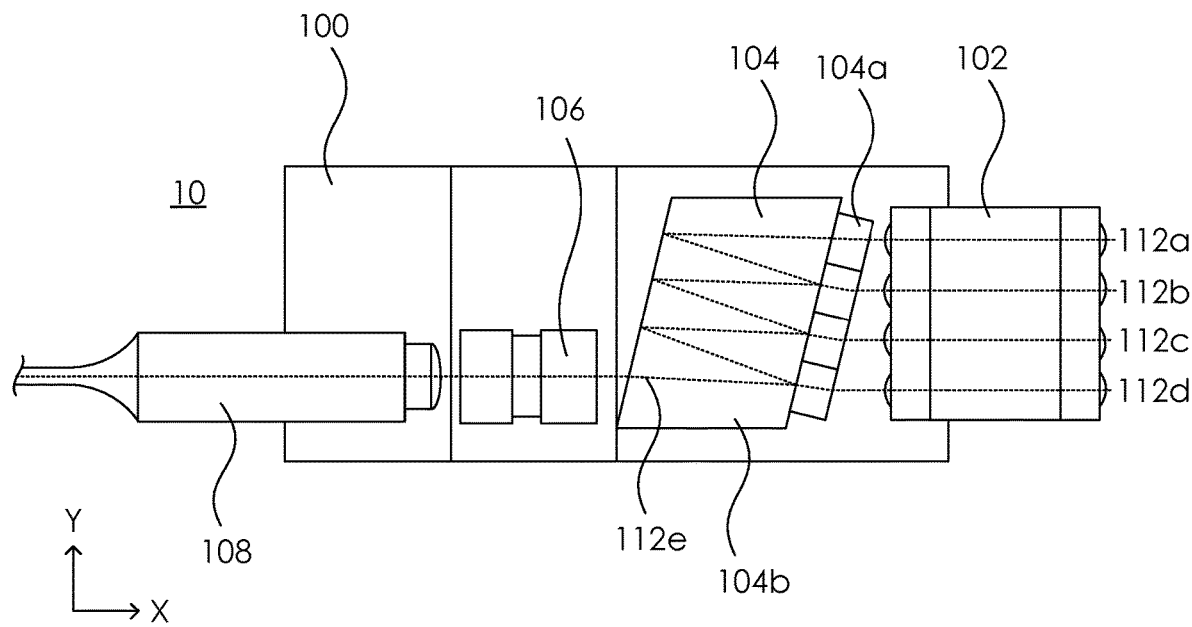
FIG. 1A illustrates a top view of an optical module according to some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer or section from another. The terms such as "first", "second", and "third" when used herein do not imply a sequence or order unless clearly indicated by the context.

In the technical field of fiber-optic communication, wavelength-division multiplexing (WDM) is a technology that multiplexes a number of optical signals onto a single signal carrier by using different wavelengths of an optical source, exploiting the character that different wavelengths can be used to carry data on the same medium. An optical fiber may be employed to transmit data parallel-by-bit or serial-by-character, while every wavelength passing the optical fiber carries an individual signal that does not interfere with the other wavelengths. This technique enables bidirectional communications over a single strand of optical fiber, also called wavelength-division duplexing, as well as multiplication of capacity.

Conventional development of wavelength-division multiplexing (WDM) module has been retarded by several factors and hence cannot achieve single fiber, bi-directional communication, free space communication, multiplex-demultiplex (MDM), easy integration with emitter and receiver, and monochromatic transmission on a single optical module. For example, some conventional WDM module uses waveguide (i.e., non-free-space) for optical transmission which increases the cost of said module, only serves one of multiplex or demultiplex purpose, use wavelength divider to split emitter signal and receiver signal so as to achieve bi-directional, or fails to implement any structural design to integrate with emitter and/or receiver. Present disclosure provides an optical module for bi-directional monochromatic transmission that allows single fiber, free space communication, MDM, and easy integration with emitter and receiver.

In some embodiments of the present disclosure, an optical module for bi-directional monochromatic transmission is provided. Such optical module can be used to connect to an optical fiber and provide the functions of wavelength-division multiplexer and demultiplexer to gather the data streams together to be transported simultaneously over the single optical fiber, or to separate the data stream into different channels. Accompany with the functions of wavelength-division multiplexer and demultiplexer, the optical module further includes the structures for communicating with the light receiver (e.g., a photodetector) and the light source (e.g., a laser diode).

Figure 1B:
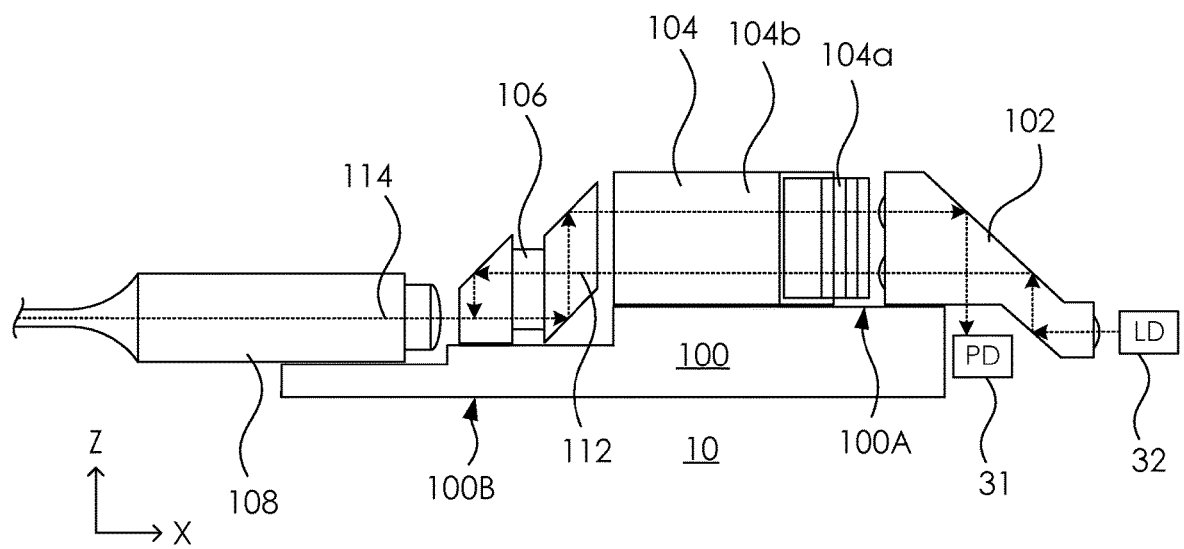
FIG. 1B illustrates a side view of an optical module according to some embodiments of the present disclosure.

Referring to the top view and the side view of an optical module for bi-directional monochromatic transmission (or briefly called an optical module 10) shown in FIGS. 1A and 1B, in some embodiments, the optical module 10 includes a substrate 100. The substrate 100 is used as a carrier base to support at least an input-output terminal 102, a multiplex-demultiplex (MDM) module 104, a circulator module 106, and a common terminal 108 disposed thereon. In some embodiments, the substrate 100 is a glass substrate or a glass ceramic substrate. The substrate 100 includes a first side 100A and a second side 100B opposite to the first side 100A. In some embodiments, as the side view shown in FIG. 1B, the substrate 100 includes a multi-level structure, which means at least a side of the substrate 100 is not a planar surface; for example, at least a side of the substrate 100 can have a terraced profile that includes a plurality of step-like terraces arranged on a slope.

In some embodiments, the input-output terminal 102 is disposed on the substrate 100 and in free space optical communication with the MDM module 104. Because the optical module 10 provided in the present disclosure includes the function in both multiplexing and demultiplexing, the input-output terminal 102 is configured to connect to an emitter and/or a receiver. Furthermore, in some embodiments of the present disclosure, the input-output terminal 102 is designed to have a unity structure instead of using two or more components for the uplink communication and the downlink communication separately. In some embodiments, such a unity structure includes a refraction structure. For example, as the embodiment shown in FIGS. 1A and 1B, a prism structure (or called an input-output prism) is applied as the input-output terminal 102 to optically communicate with the MDM module 104 and the emitter (e.g., laser diode, abbreviated to LD) and the receiver (e.g., a photodetector, abbreviated to PD).

Figure 1C:
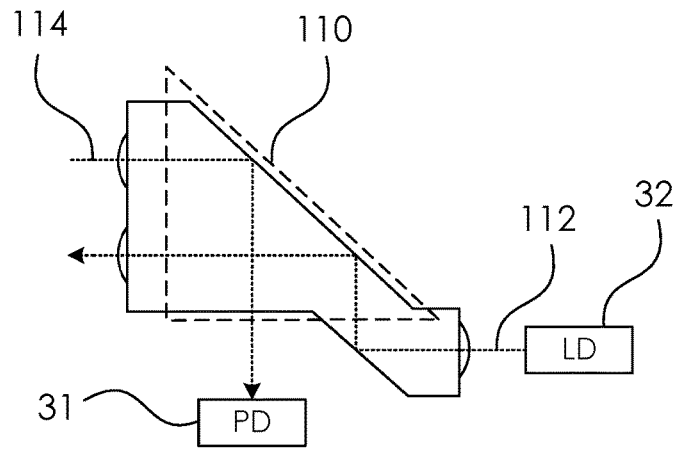
FIG. 1C illustrates a side view of an input-output terminal according to some embodiments of the present disclosure.
Figure 1D:
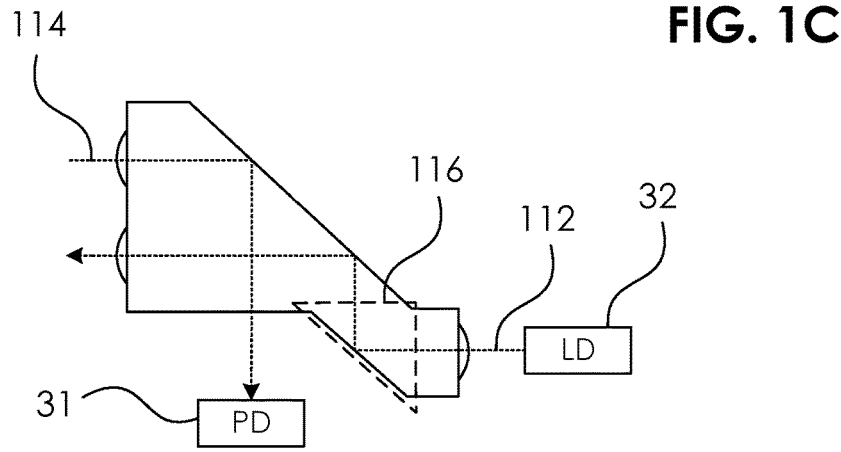
FIG. 1D illustrates a side view of an input-output terminal according to some embodiments of the present disclosure.

In some embodiments, referring to FIGS. 1A to 1C, the input-output terminal 102 includes a first right angle prism 110 configured to refract a first directional transmission 114 prior to entering the receiver 31 and a second directional transmission 112 that transmits from the emitter 32. Furthermore, as shown in FIG. 1D, a second right angle prism 116 can be disposed in contact with the first right angle prism 110. The second right angle prism 116 is configured to refract the second directional transmission 112 after transmitting from the emitter 32. By using the second right angle prism 116, the second directional transmission 112 transmitted from the emitter 32 can be refracted or reflected twice before leaving the input-output terminal 102.

To be more detailed, the first right angle prism 110 and the second right angle prism 116 can be used to change the direction of the first directional transmission 114 and the second directional transmission 112. Under the circumstances that the second directional transmission 112 is refracted or reflected by the first right angle prism 110 and the second right angle prism 116 subsequently as shown in FIGS. 1C and 1D, the second directional transmission 112 can be shifted parallel instead of changing the direction thereof.

Figure 1E:
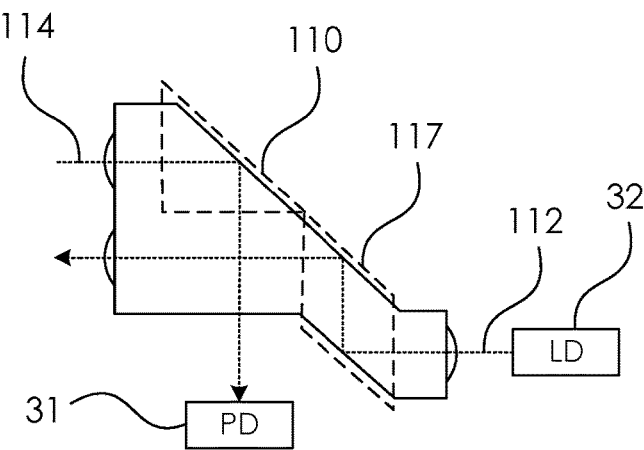
FIG. 1E illustrates a side view of an input-output terminal according to some embodiments of the present disclosure.

That is, in some embodiments, as shown in FIG. 1E, the input-output terminal 102 is functioned as a combination of the first right angle prism 110 and a rhomboid prism 117, while the first right angle prism 110 can be used to change the direction of the first directional transmission 114 prior to being received by the receiver 31, and the rhomboid prism 117 can be used to shift the path of the second directional transmission 112 after transmitting from the emitter 32. Generally, the material of the first right angle prism 110, the second right angle prism 116, and the rhomboid prism 117 are the same, which can include glass, acrylic, or fluorite, typically.

Still referring to FIGS. 1A and 1B, in some embodiments, after a plurality of optical transmission signals (e.g., the second directional transmissions 112a, 112b, 112c, and 112d) are transmitted from the emitter 32 and refracted or reflected by the input-output terminal 102, these optical transmission signals can subsequently pass through the MDM module 104 and be multiplexed by the MDM module 104 to output a multi-channel optical transmission signal 112e. In some embodiments, the MDM module 104 includes a Z-block structure and in free space optical communication with the input-output terminal 102. Since a plurality of the optical transmission signals transmitted from the emitter 32 are aligned to the MDM module 104, these optical transmission signals can be reflected continuously and may travel along a zig-zag route within the inner space of the MDM module 104. In some embodiments, the multi-channel optical transmission signal 112e that leaving the MDM module 104 is substantially parallel to the second directional transmissions 112a, 112b, 112c, and 112d that are emitted by the emitter 32 prior to entering the MDM module 104.

In some embodiments, the MDM module 104 may include a plurality of filters between a plurality of support bodies 104a and the MDM body 104b. In some embodiments, the plurality of filters are bandpass filters (BPFs). In some embodiments, a high-reflection film can be coated on a side of the MDM body 104b that distance from the input-output terminal 102. The high-reflection film is configured to reflect the second directional transmissions 112a, 112b, and 112c. In some embodiments, an anti-reflection film can be coated on the side of the MDM body 104b that distance from the input-output terminal 102. The multi-channel optical transmission signal 112e may leave the MDM module 104 and pass through the anti-reflection film. In some embodiments, the support bodies 104a and the MDM body 104b are transparent and may be made from a wide variety of materials including glass, quartz, optical plastic, etc.

As aforementioned, the substrate 100 can include a multi-level structure, and therefore other components of the optical module 10 can be disposed on different levels of the substrate 100. In some embodiments, the MDM module 104 is laterally leveled with the input-output terminal 102 on the substrate 100, while a portion of the input-output terminal 102 is free from directly in contact with the first side 100A of the substrate 100. In some embodiments, the second directional transmissions 112a, 112b, 112c, and 112d and the multi-channel optical transmission signal 112e directly over the first side of the substrate 100 cab substantially parallel to each other from a side view perspective, as shown in FIG. 1B. In some embodiments, the multi-channel optical transmission signal 112e leaving from the MDM module 104 can be further refracted or reflected to lower the level thereof.

In some embodiments, the MDM module 104 is disposed on the substrate 100 and in free space optical communication with the circulator module 106. In some embodiments, the circulator module 106 is configured to spatially separate the first directional transmission 114 to the MDM module 104 from the second directional transmission 112 from the MDM module 104 on a plane perpendicular to the substrate 100.

Still referring to FIGS. 1A and 1B, in some embodiments, the multi-channel optical transmission signal 112e leaving the MDM module 104 can subsequently pass through the circulator module 106. The circulator module 106 is configured to change the path of the multi-channel optical transmission signal 112e to align with the common terminal 108. As shown in FIG. 1B, by using the circulator module, the first directional transmission 114 and the second directional transmission 112 can be spatially separated. That is, the optical paths of the first directional transmission 114 that are provided from the common terminal 108 and the second directional transmission 112 leaving from the MDM module 104 (i.e., the multi-channel optical transmission signal 112e) are free from overlapping within the circulator module 106. Accordingly, in some embodiments, the circulator module 106 is configured to spatially separate the first directional transmission 114 to the MDM module 104 from the second directional transmission 112 from the MDM module 104.

Figure 1F:
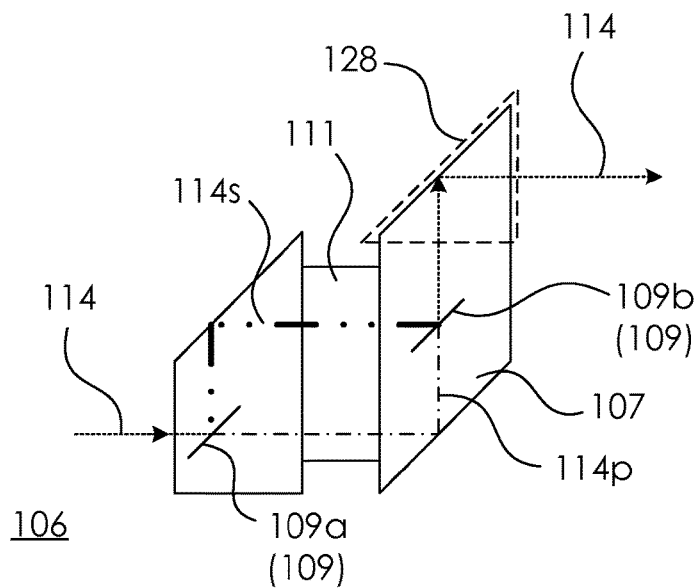
FIG. 1F illustrates a side view of a circulator module according to some embodiments of the present disclosure.
Figure 1G:
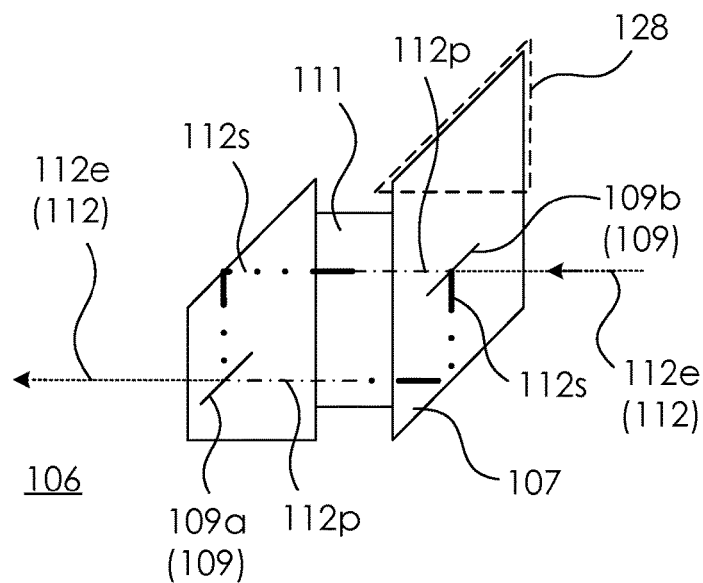
FIG. 1G illustrates a side view of a circulator module according to some embodiments of the present disclosure.

Referring to FIGS. 1F and 1G, in some embodiments, the circulator module 106 includes a circulator portion 107 and a reflector portion 128 optically coupled to the circulator portion. In some embodiments, the circulator portion 107 is in contact with the reflector portion 128 so that the circulator portion 107 and the reflector portion 128 are substantially integrated as a single unit. As shown in FIG. 1F, both the circulator portion 107 and the reflector portion 128 of the circulator module 106 can be used to reflect the first directional transmission 114 from the common terminal 108 (not shown in the figure), whereas the second directional transmission 112 is only reflected by the circulator portion 107. In some embodiments, the circulator module 106 includes two polarization beam splitters 109 therein. The polarization beam splitter 109 can be used to split a single light beam into two beams of mutually orthogonal polarizations, for example, p-polarization and s-polarization.

Referring to FIG. 1F, under the scenario that an incident beam such as the first directional transmission 114 is transmitting from the common terminal 108, the first directional transmission 114 directly impinging on the polarization beam splitter 109a and be firstly split into a first p-polarization beam 114p (illustrated by a dotted dashed line) and a first s-polarization beam 114s (illustrated by a bold double dotted dashed line) by one of the polarization beam splitter (e.g., the polarization beam splitter 109a) of the circulator module 106. The first p-polarization beam 114p passes through the polarization beam splitter 109a and the first s-polarization beam 114s is reflected by the polarization beam splitter 109a. Then, the first p-polarization beam 114p and the first s-polarization beam 114s can be respectively reflected by the reflective surfaces of the circulator portion 107 prior to arriving at the lower stream polarization beam splitter 109 (e.g., the polarization beam splitter 109b) of the circulator module 106. Note the combination of a half wave plate and Faraday rotator 111 is devised not to change the polarization state of the first s-polarization beam 114s and the first p-polarization beam 114p. Under a similar principle, the first s-polarization beam 114s and the first p-polarization beam 114p are recombined into the first directional transmission 114 that exits the circulator module 106, demonstrating a parallel shift from the first directional transmission 114 that enter the circulator module 106.

Referring to FIG. 1G, under the scenario when an incident beam such as the second directional transmission 112 is leaving the MDM module 104 and entering the circulator module 106, under a similar principle, the second directional transmission 112 directly impinging on the polarization beam splitter 109b and then be split by the second polarization beam splitter 109b into a second p-polarization beam 112p and a second s-polarization beam 112s. Subsequently, the combination of a half wave plate and Faraday rotator 111 is devised to change the polarization state of the second p-polarization beam 112p and the second s-polarization beam 112s each by 90 degrees, rendering the recombined beam (i.e., the second directional transmission 112) that exits the circulator module 106 to demonstrate a parallel shift from the second directional transmission 112 that enter the circulator module 106.

Figure 1H:
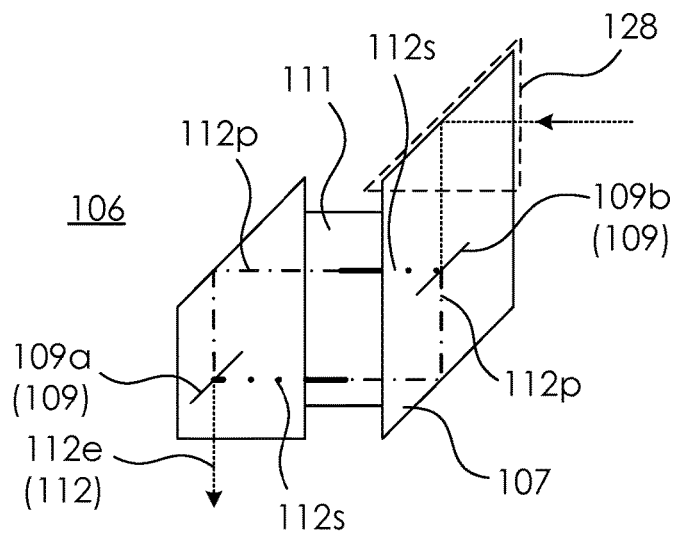
FIG. 1H illustrates a side view of a circulator module according to an alternative embodiment.

In some comparative embodiments of the present disclosure as shown in FIG. 1H, under the circumstances that the second directional transmission 112 entering the circulator module 106 by an optical path impinging a reflective surface of the reflector portion 128, the resulting recombined beam (i.e., the second directional transmission 112) that exits the circulator module 106 would be perpendicular, instead of parallel, to the second directional transmission 112 that enter the circulator module 106. Therefore, such arrangement may not be suitable to be exploited in the optical module 10 of the present disclosure.

In some embodiments, the common terminal 108 is disposed adjacent to the substrate 100 and connected to an optical fiber. In some embodiments, the common terminal 108 is disposed on the substrate 100. In some embodiments, the common terminal 108 is not leveled with the circulator module 106. In some embodiments, the common terminal 108 includes a collimator. In some embodiments, the first directional transmission 114 is provided from the common terminal 108. In some embodiments, the second directional transmission 112 (i.e., the multi-channel optical transmission signal 112e) can enter the common terminal 108 after leaving the circulator module 106. Generally, the common terminal 108 is used to provide the optical transmission signals from a remote end (i.e., downlink communication)

and to transmit the multiplexed multi-channel optical transmission signal to the remote end (i.e., uplink communication).

Figure 2A:
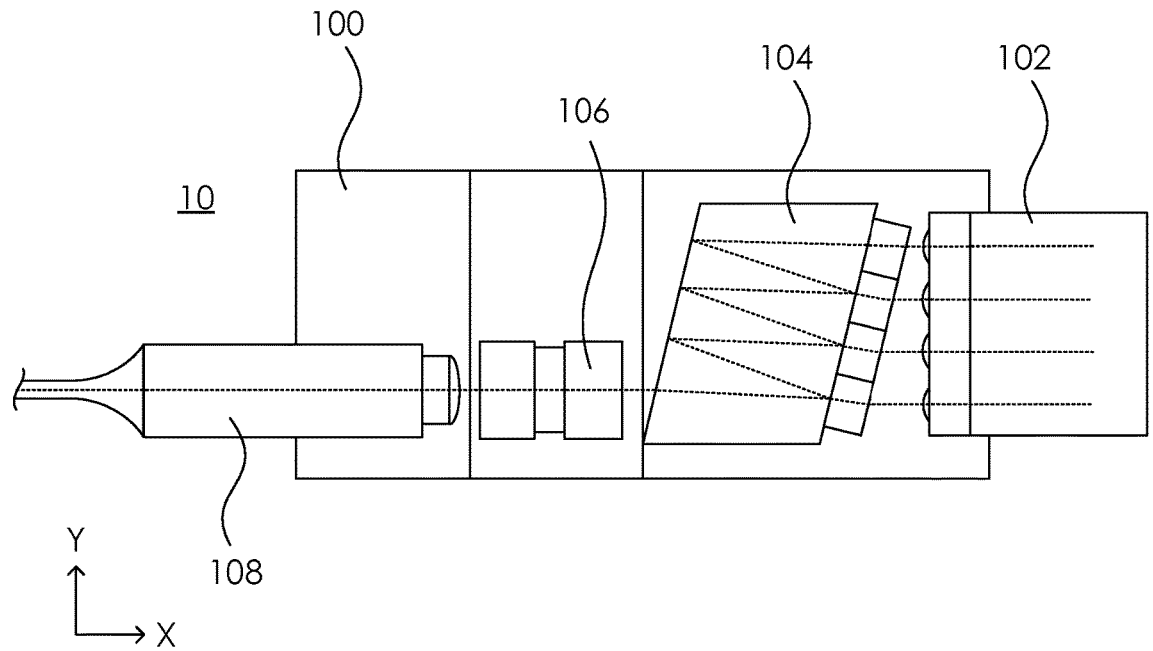
FIG. 2A illustrates a top view of an optical module according to some embodiments of the present disclosure.
Figure 2B:
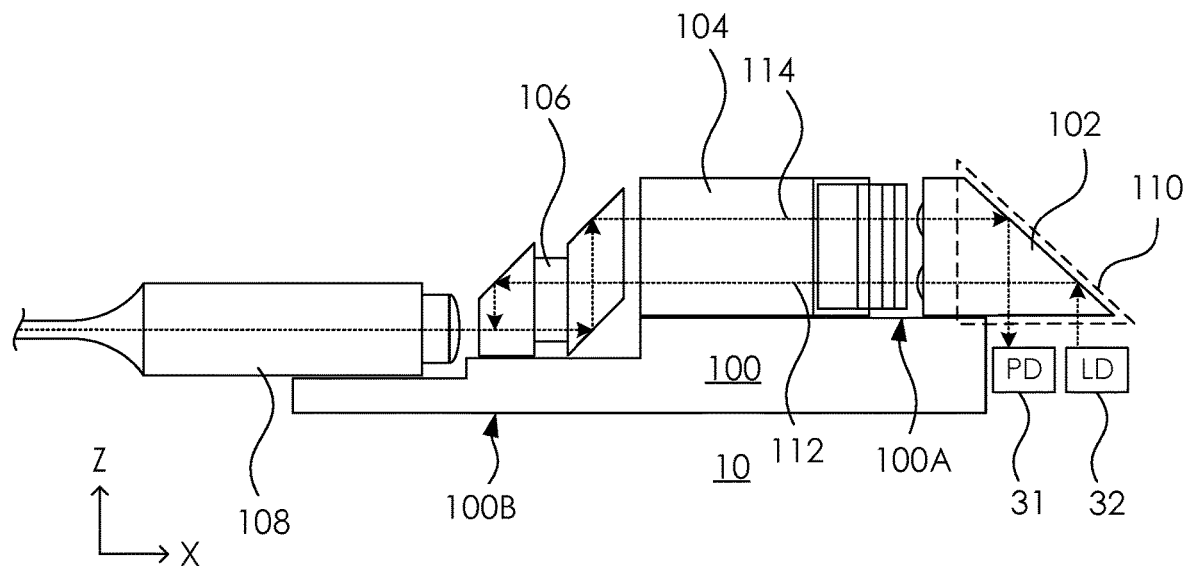
FIG. 2B illustrates a side view of an optical module according to some embodiments of the present disclosure.

Referring to FIGS. 2A and 2B, in some embodiments, the receiver 31 and the emitter 32 can be disposed in the same direction corresponding to the input-output terminal 102. That is, the receiver 31 and the emitter 32 can be disposed in proximity to the same side of the input-output terminal 102. In some embodiments, the input-output terminal 102 includes the first right angle prism 110, while the first right angle prisms 110 in these embodiments are configured to refract or reflect the first directional transmission 114 and the second directional transmission 112.

Comparing the embodiments shown in FIGS. 1A and 1B, the arrangement of the emitter 32 is different from the embodiments shown in FIGS. 2A and 2B. Under the circumstances that the emitter 32 is an edge emitting laser (EEL) diode, the receiver 31 and the emitter 32 can be disposed at different sides of the input-output terminal 102 (as shown in FIG. 1B). Under the circumstances that the emitter 32 is a vertical-cavity surface-emitting laser (VCSEL) diode, the receiver 31 and the emitter 32 can be disposed at the same side of the input-output terminal 102, and therefore the first directional transmission 114 and the second directional transmission 112 are substantially in parallel near the input-output terminal 102. In other embodiments, the first directional transmission 114 is substantially perpendicular to the second directional transmission 112 near the input-output terminal 102.

In the embodiments shown in FIGS. 1A to 2B, the receiver 31 and the emitter 32 can be an onboard photodetector array and an onboard laser diode array that in proximity to the input-output terminal 102, respectively. In other embodiments, the receiver 31 and the emitter 32 can be an external photodetector array and an external laser diode array, respectively, which will be illustrated in later paragraphs.

Figure 3A:
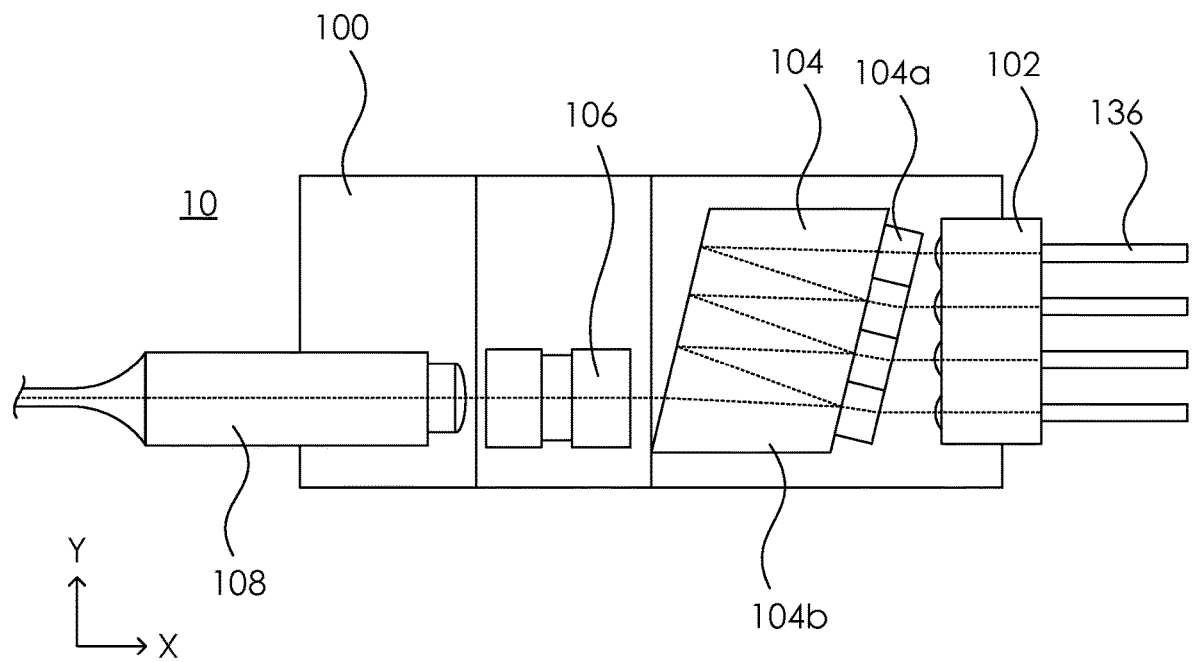
FIG. 3A illustrates a top view of an optical module according to some embodiments of the present disclosure.
Figure 3B:
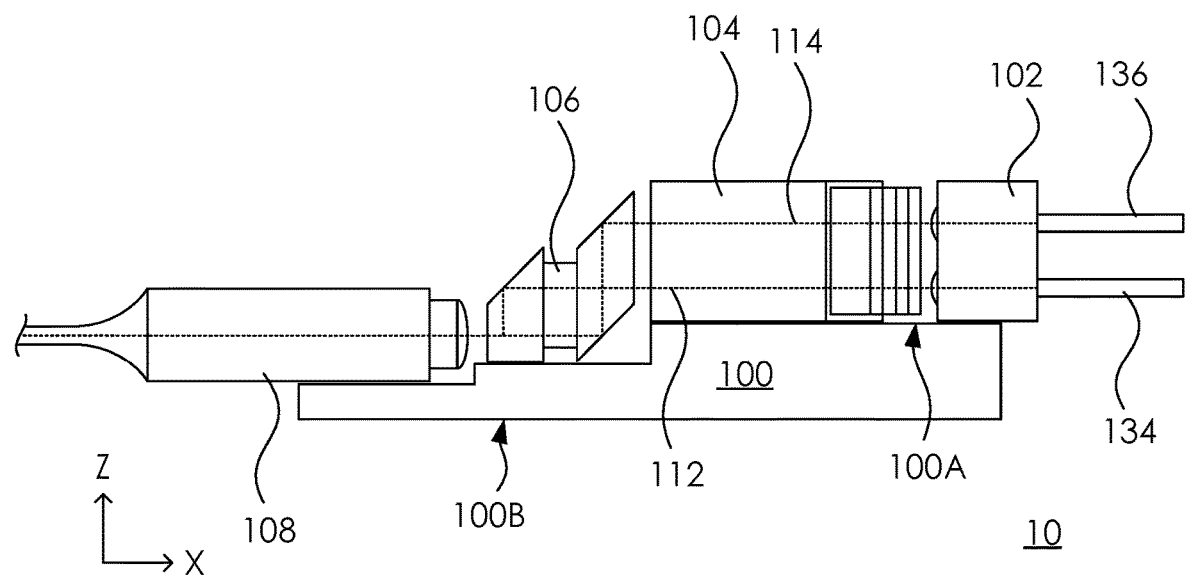
FIG. 3B illustrates a side view of an optical module according to some embodiments of the present disclosure.

Referring to FIGS. 3A and 3B, in some embodiments, the input-output terminal 102 can further be divided into a lower portion and an upper portion that directly stacked on the lower portion. In some embodiments, the upper portion of the input-output terminal 102 is a first terminal array including a collimator-array-structure that is configured to perform as an input terminal array, while the lower portion of the input-output terminal 102 is a second terminal array including the collimator-array-structure that configured to perform as an output terminal array.

That is, in some embodiments, the input terminal array and the output terminal array can be stacked vertically. In some embodiments, the input-output terminal 102 is connected to a plurality of first optical fibers 134 and a plurality of second optical fibers 136. In some embodiments, the lower portion of the input-output terminal 102 is connected to the plurality of first optical fibers 134, while these first optical fibers 134 are optical communicated with the external photodetector array to transmit the second directional transmission 112 from the MDM module 106 to the external photodetector array. In some embodiments, the upper portion of the input-output terminal 102 is connected to the plurality of second optical fibers 136, while these second optical fibers 136 are optical communicated with the external laser diode array to transmit the first directional transmission 114 from the external laser diode array to the MDM module 106.

By using the input-output terminal 102 shown in FIGS. 3A and 3B, the laser diode array and the photodetector array can be disposed distant from the optical module 10, such external design is particularly suitable for the high-power laser diode array. That is, considering that the high-power laser diode array may have a high working temperature, the input terminal array can be applied to isolate the optical module 10 from the unwanted heat generated by the high-power laser diode array. Furthermore, even though the working temperature of the photodetector array is lower than that of the high-power laser diode array, considering the convenience of manufacture, the output terminal array still can be applied and directly stacked with the input terminal array as the embodiment shown in FIGS. 3A and 3B.

Figure 4A:
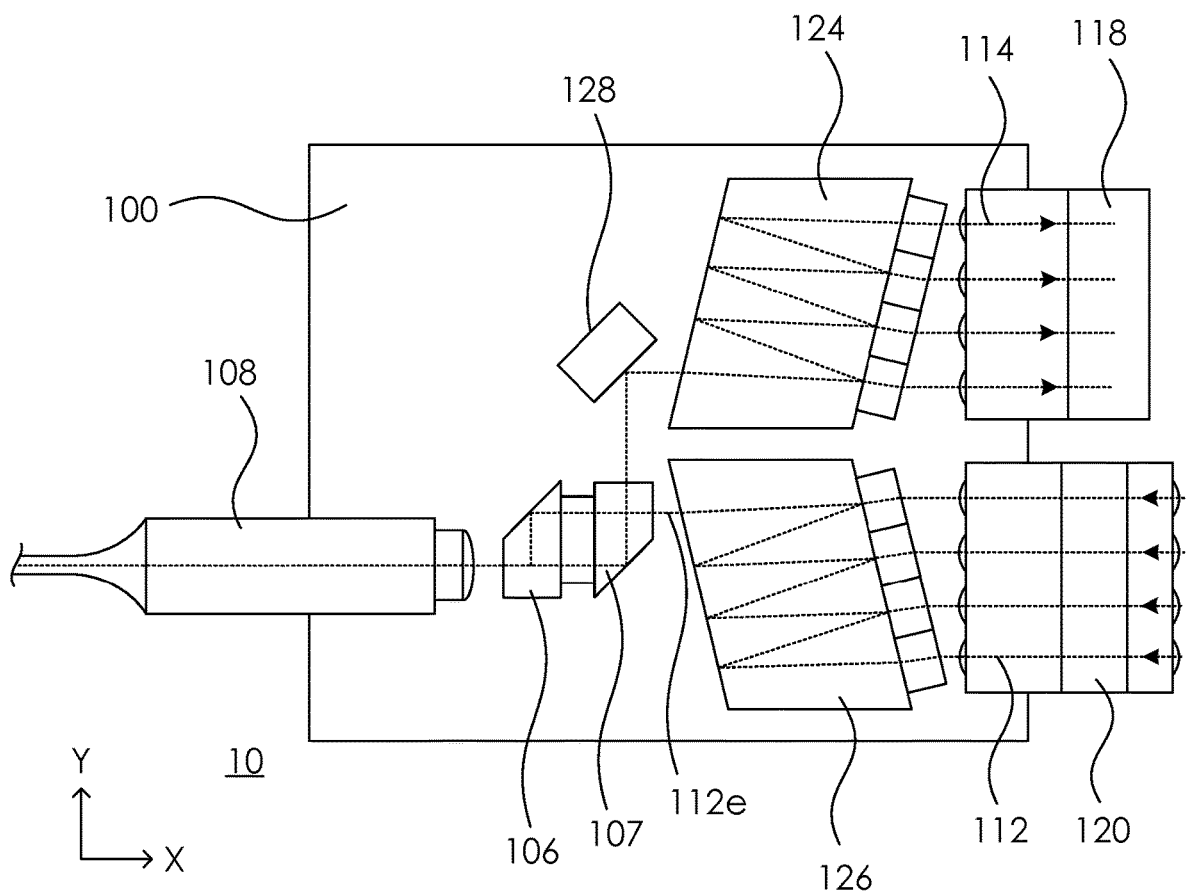
FIG. 4A illustrates a top view of an optical module according to some embodiments of the present disclosure.
Figure 4B:
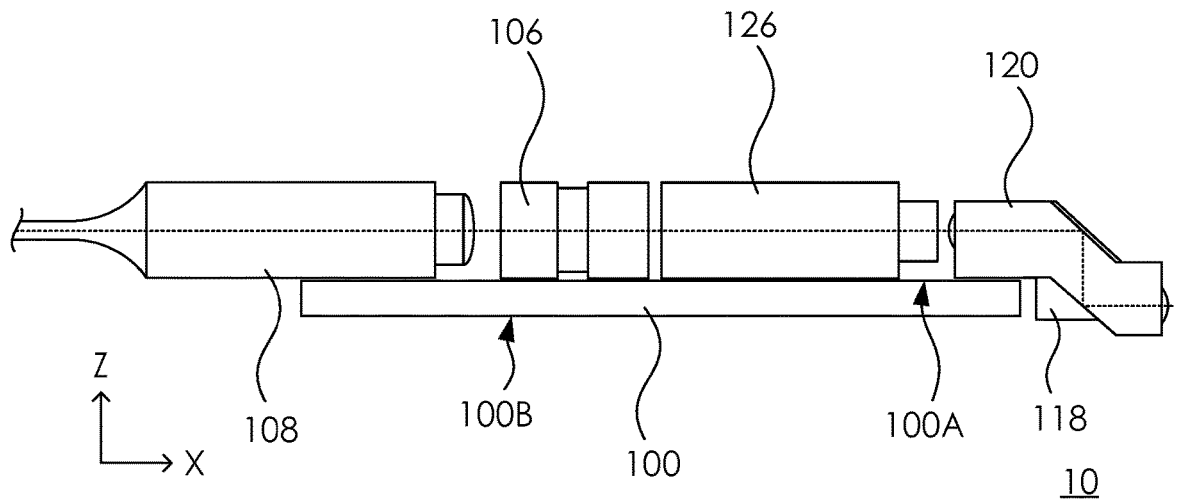
FIG. 4B illustrates a side view of an optical module according to some embodiments of the present disclosure.

Referring to FIGS. 4A and 4B, in some embodiments, the substrate 100 is free from having a multi-level structure. For example, as shown in FIG. 4B, the first side 100A of the substrate 100 includes a planar profile. In such embodiments, the input-output terminal 102, the MDM module (e.g., a first Z-block 124 and a second Z-block 126), the circulator module 106, and the common terminal 108 are all leveled with each other. Compared with the embodiments that use the substrate 100 having the multi-level structure, the embodiments that use a planar substrate can provide a thinner optical module, which can be applied to the scenario that the vertical space is limited.

As shown in FIG. 4A, in some embodiments, the MDM module can include more than one Z-block structure. That is, in some embodiments, the MDM module can include the first Z-block 124 and the second Z-block 126 laterally disposed on the substrate 100. By using the first Z-block 124 and the second Z-block 126, the first directional transmission 114 can be substantially leveled with the second directional transmission 112 over the substrate 100. Furthermore, in such embodiments, the input-output terminal 102 can further include an input terminal 118 and an output terminal 120 is laterally disposed on the substrate 100. In some embodiments, the first Z-block 124 is in free space optical communication with the input terminal 118 and the second Z-block 126 is in free space optical communication with the output terminal 120. In some embodiments, the first Z-block 124 is in mirror symmetry with respect to the second Z-block 126.

Figure 4C:
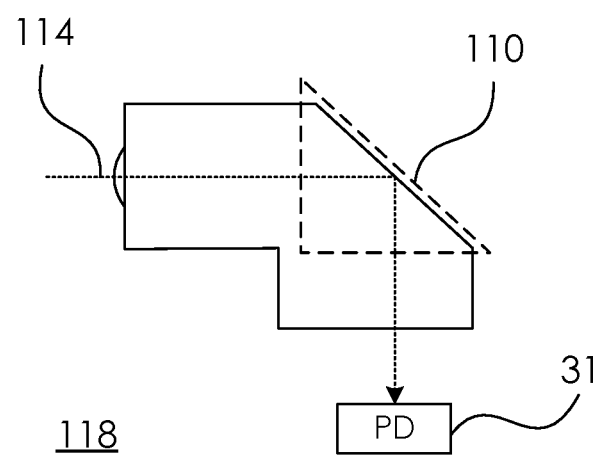
FIG. 4C illustrates a side view of an output terminal according to some embodiments of the present disclosure.
Figure 4D:
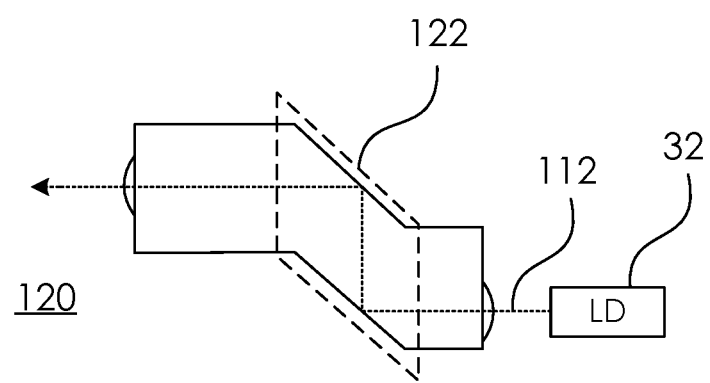
FIG. 4D illustrates a side view of an input terminal according to some embodiments of the present disclosure.

In some embodiments, the form of the input terminal 118 can be different from the output terminal 120. For example, as illustrated in FIG. 4C, the input terminal 118 can include the first right angle prism 110 (like the embodiment previously shown in FIG. 1C), whereas the output terminal 120 can include a rhomboid prism 122 as illustrated in FIG. 4D (like the embodiment previously shown in FIG. 1E). Accordingly, the first directional transmission 114 after leaving the input terminal 118 can be substantially perpendicular to the second directional transmission 112 prior to entering the output terminal 120.

Still referring to FIG. 4A, in some embodiments, the circulator module 106 is configured to spatially separate the first directional transmission 114 to the first Z-block 124 of the MDM module and the second directional transmission 112 from the second Z-block 126 of the MDM module on a plane parallel to the substrate 100. Furthermore, the circulator portion 107 and the reflector portion 128 of the circulator module 106 can be separately disposed on the substrate 100. In such embodiment, the circulator portion 107 is disposed in proximity to the second Z-block 126, and the circulator portion 107 is configured to receive the multi-channel optical transmission signal $112e$ multiplexed by the second Z-block 126, whereas the signal provided by the common terminal 108 can enter the circulator portion 107 and further be delivered to the reflector portion 128. In some embodiments, the reflector portion 128 is disposed on the substrate 100, and in free space optical communication with the first Z-block 124 and the circulator portion 107. Thus, the first directional transmission 114 from the common terminal 108 can be reflected by the reflector portion 128 after leaving the circulator portion 107 and prior to entering the first Z-block 124. The placement of the reflector portion 128 enhances the versatility of the optical module because both the distance between the reflector portion 128 and the first Z-block 124, and the placement angle of the reflector portion 128 can be adjusted under different application scenarios.

Figure 5A:
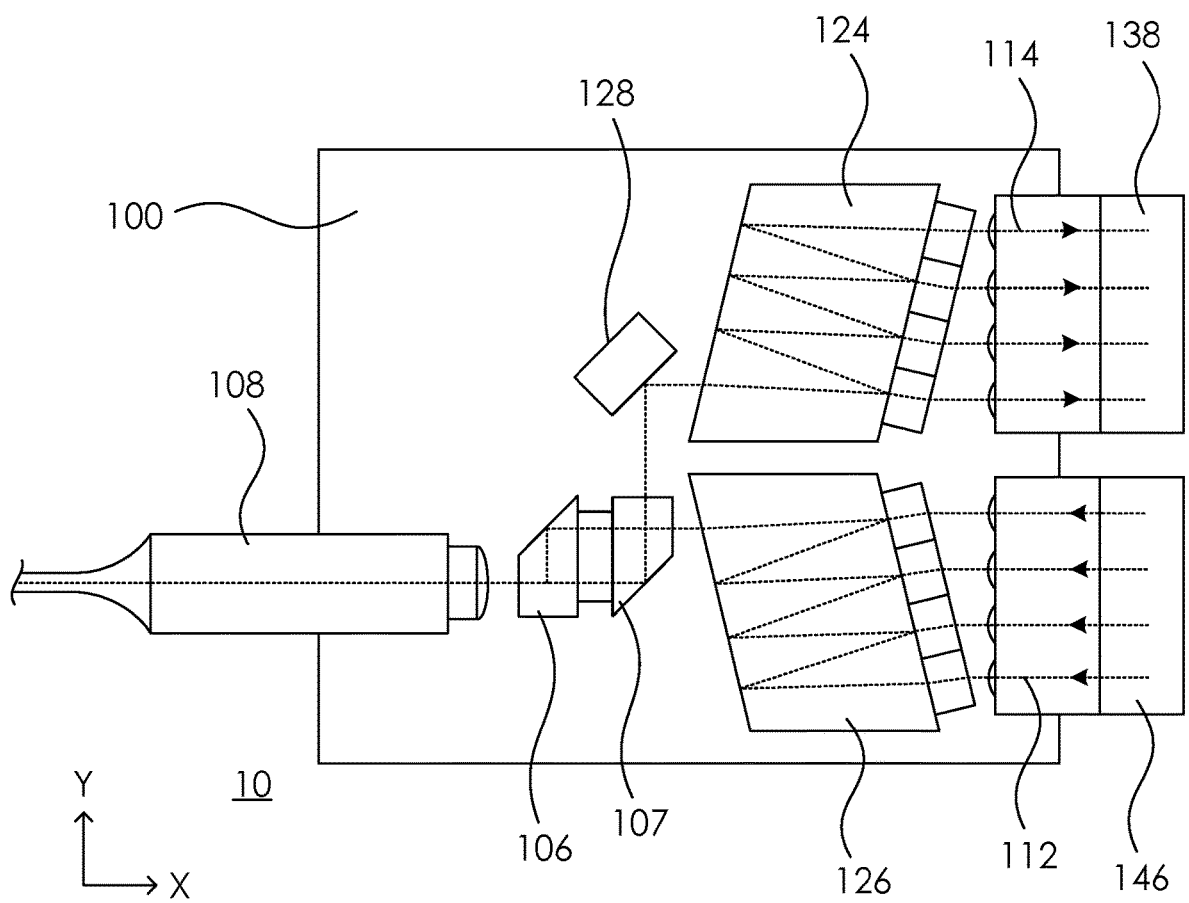
FIG. 5A illustrates a top view of an optical module according to some embodiments of the present disclosure.
Figure 5B:
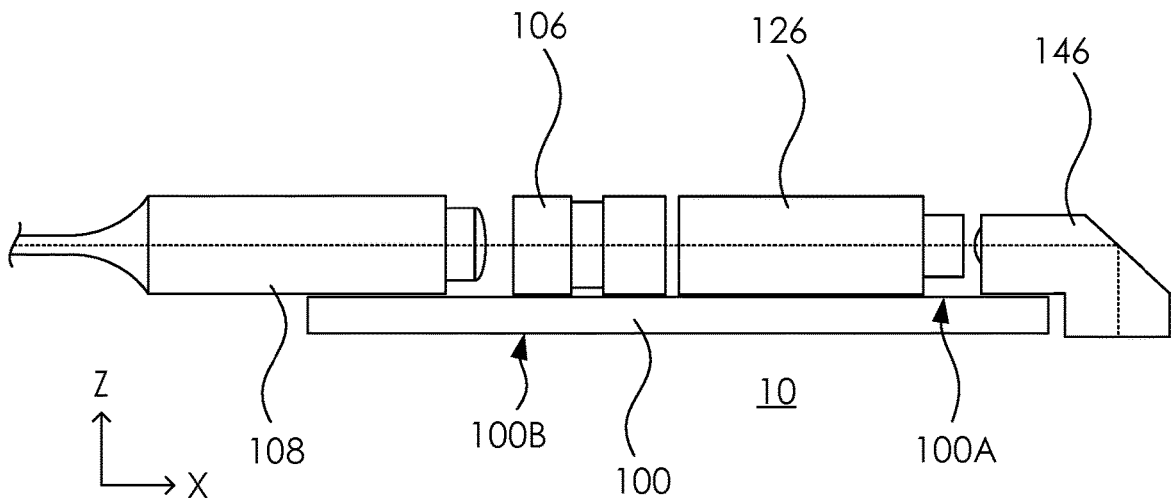
FIG. 5B illustrates a side view of an optical module according to some embodiments of the present disclosure.

Referring to FIGS. 5A and 5B, in some embodiments, the input-output terminal can include an input terminal 138 and an output terminal 146, while the structure of the input terminal 138 and the output terminal 146 are identical to each other. For instance, both the input terminal 138 and the output terminal 146 can include the first right angle prism 110 as previously shown in FIG. 1C or FIG. 4D. In such example, both the receiver 31 and the emitter 32 are disposed at the same side of the input-output terminal, and therefore the first directional transmission 114 after leaving the input terminal 138 is substantially parallel to the second directional transmission 112 prior to entering the output terminal 146.

Figure 6A:
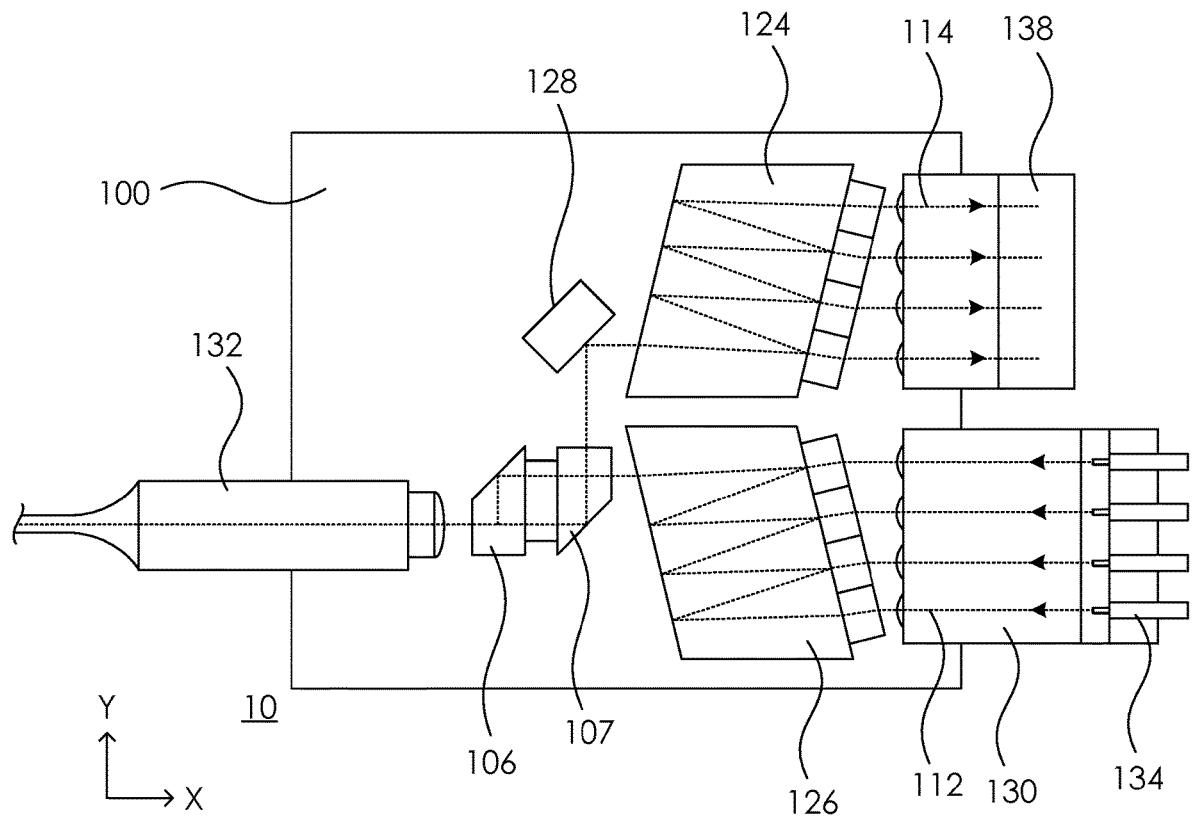
FIG. 6A illustrates a top view of an optical module according to some embodiments of the present disclosure.
Figure 6B:
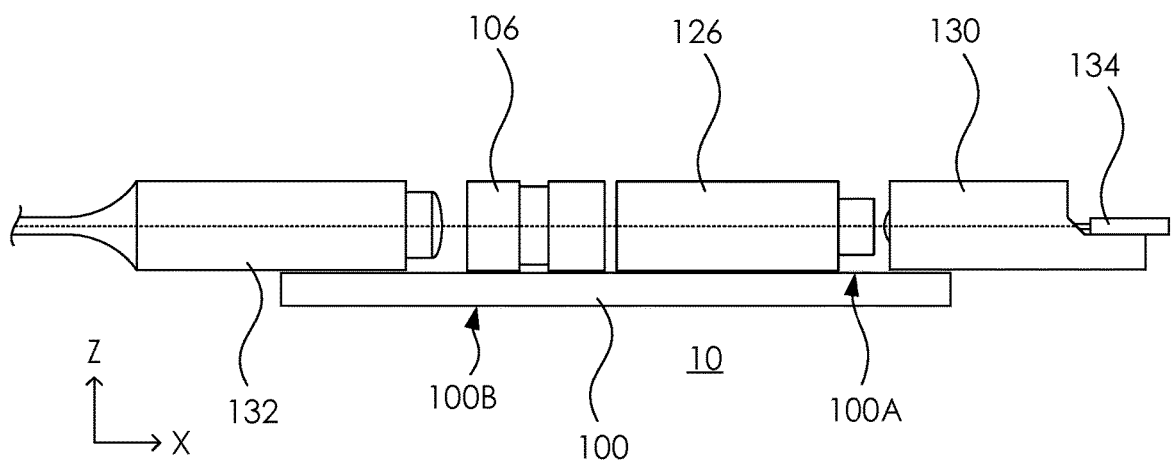
FIG. 6B illustrates a side view of an optical module according to some embodiments of the present disclosure.

Referring to FIGS. 6A and 6B, in some embodiments, one of the terminals can be replaced by a terminal array 130. For instance, the output terminal can be replaced by the terminal array 130, while the terminal array 130 is connected to the plurality of first optical fibers 134 to input the optical signals from the external emitter. As aforementioned, the high-power laser diode array may have a high working temperature, and therefore the terminal array 130 is an input terminal array so that the unwanted heat generated by the high-power laser diode array can be isolated from the optical module 10. Compared with the high-temperature issue that is considered in the input part, the output part of the input-output terminal can be free from using the terminal array. Thus, in some embodiments, an input terminal 138 made of the prism can be disposed align with the terminal array 130, without using the collimator-array-structure as the terminal array 130 does.

Figure 7A:
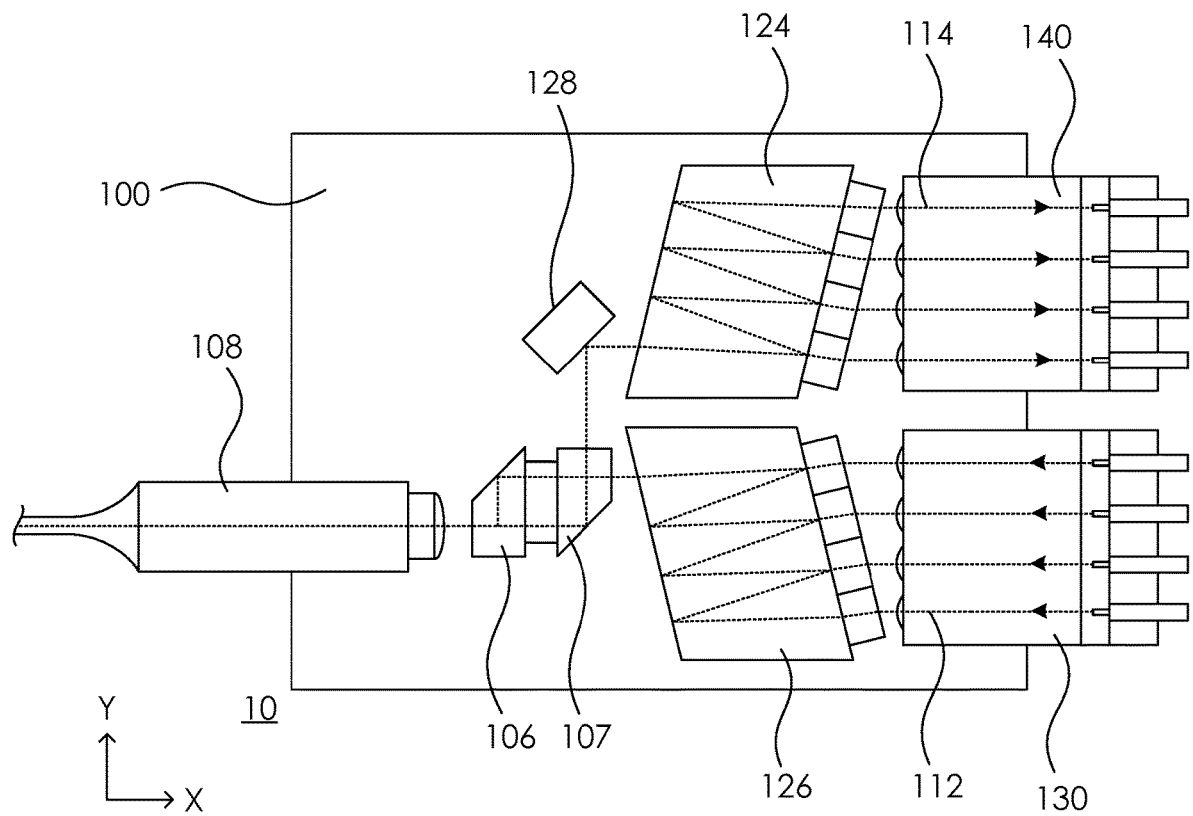
FIG. 7A illustrates a top view of an optical module according to some embodiments of the present disclosure.
Figure 7B:
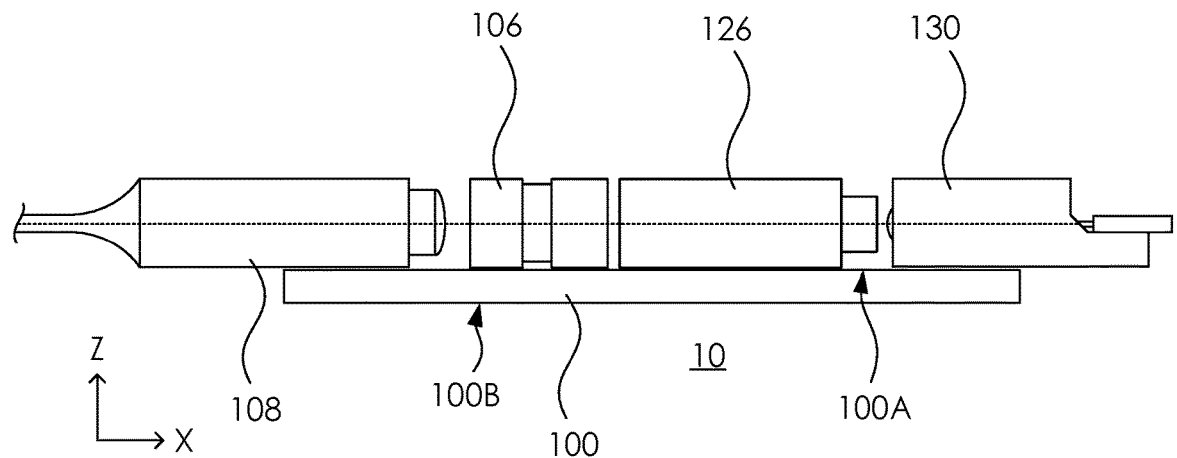
FIG. 7B illustrates a side view of an optical module according to some embodiments of the present disclosure.

Referring to FIGS. 7A and 7B, in some embodiments, the output part of the input-output terminal can also use a collimator-array-structure as the input part does. The input-output terminal of the optical module 10 thus includes two terminal arrays 130, and 140 that are laterally aligned to each other on the substrate 100. In such embodiments, the terminal array 140 is coupled with the receiver through a plurality of optical fibers therebetween. In such embodiments, the laser diode array and the photodetector array can be disposed distant from the optical module 10, like the external design embodiments previously disclosed in FIGS. 3A and 3B.

Figure 8A:
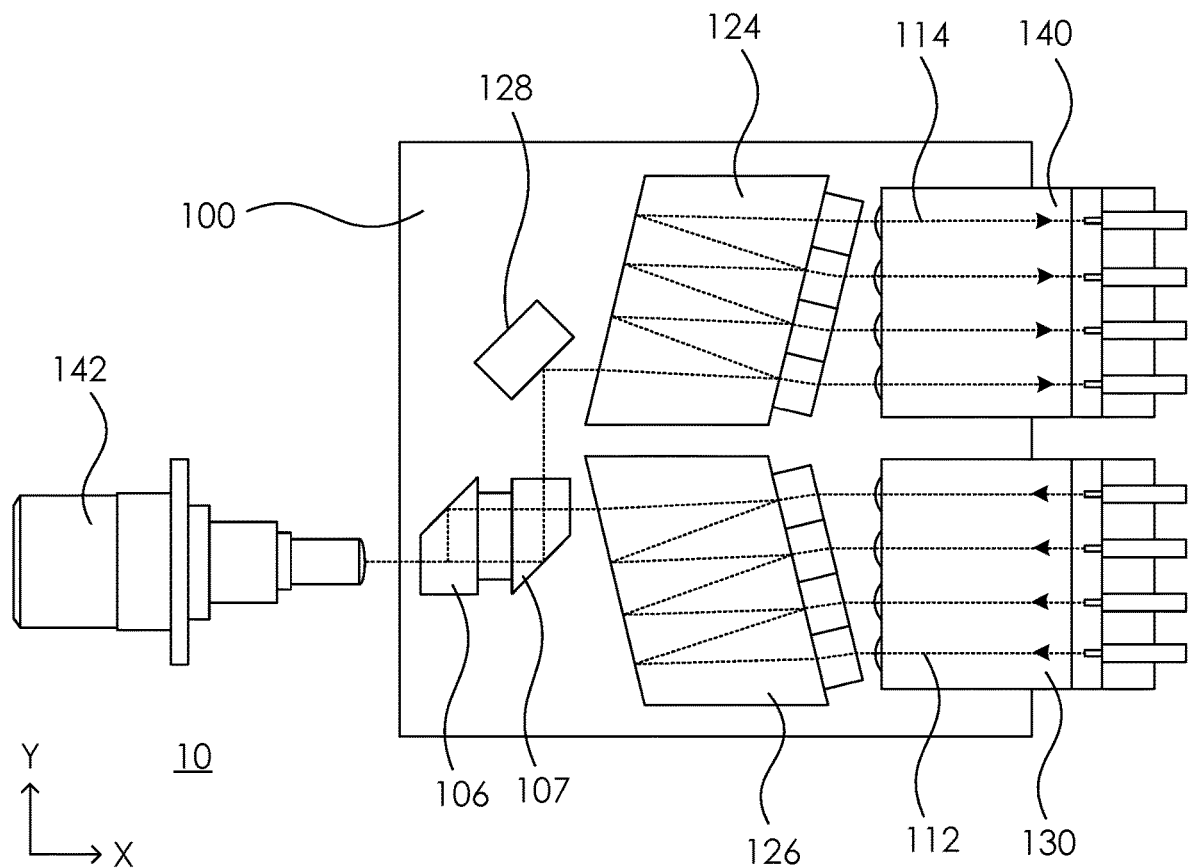
FIG. 8A illustrates a top view of an optical module according to some embodiments of the present disclosure.
Figure 8B:
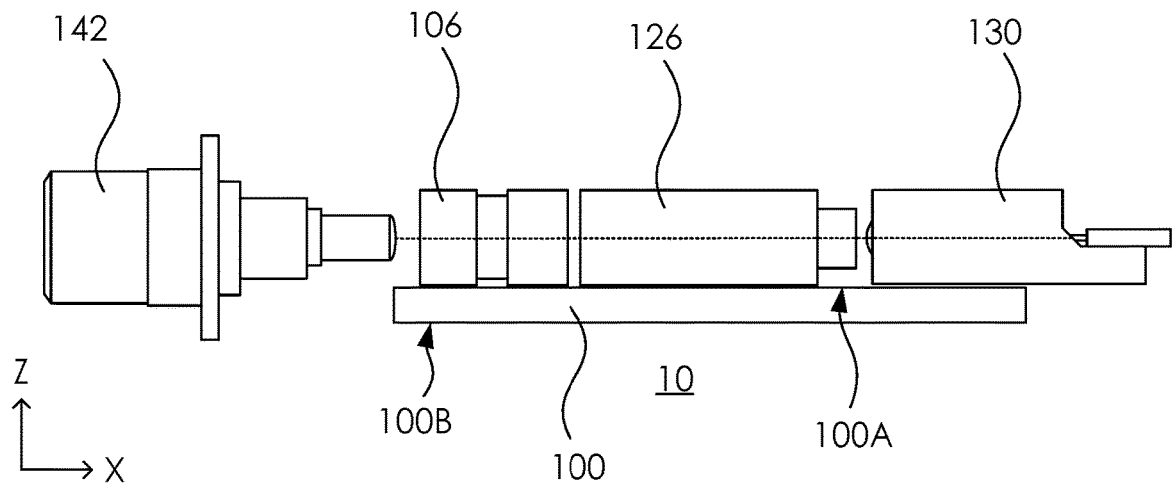
FIG. 8B illustrates a side view of an optical module according to some embodiments of the present disclosure.

Referring to FIGS. 8A and 8B, in some embodiments, the substrate 100 of the optical module 10 can be designed to be installed within a cassette structure so that the users can plug and unplug the common terminal manually. In such embodiments, the common terminal of the optical module 10 can be an LC receptacle 142. In other words, the common terminals having the fiber-collimator-structure as shown in each of the embodiments previously can be replaced by LC receptacles. Generally, the cassette structure having the substrate 100 installed therein may have a housing that is configured to match the LC receptacle 142, and thereby the optical path of the LC receptacle 142 may align with the first directional transmission 114 and the second directional transmission 112 that passing the circulator module 106. The input-output terminal of the optical module 10 can be substantially identical to that in the embodiments shown in FIGS. 7A and 7B, and omitted here for brevity.

Figure 9A:
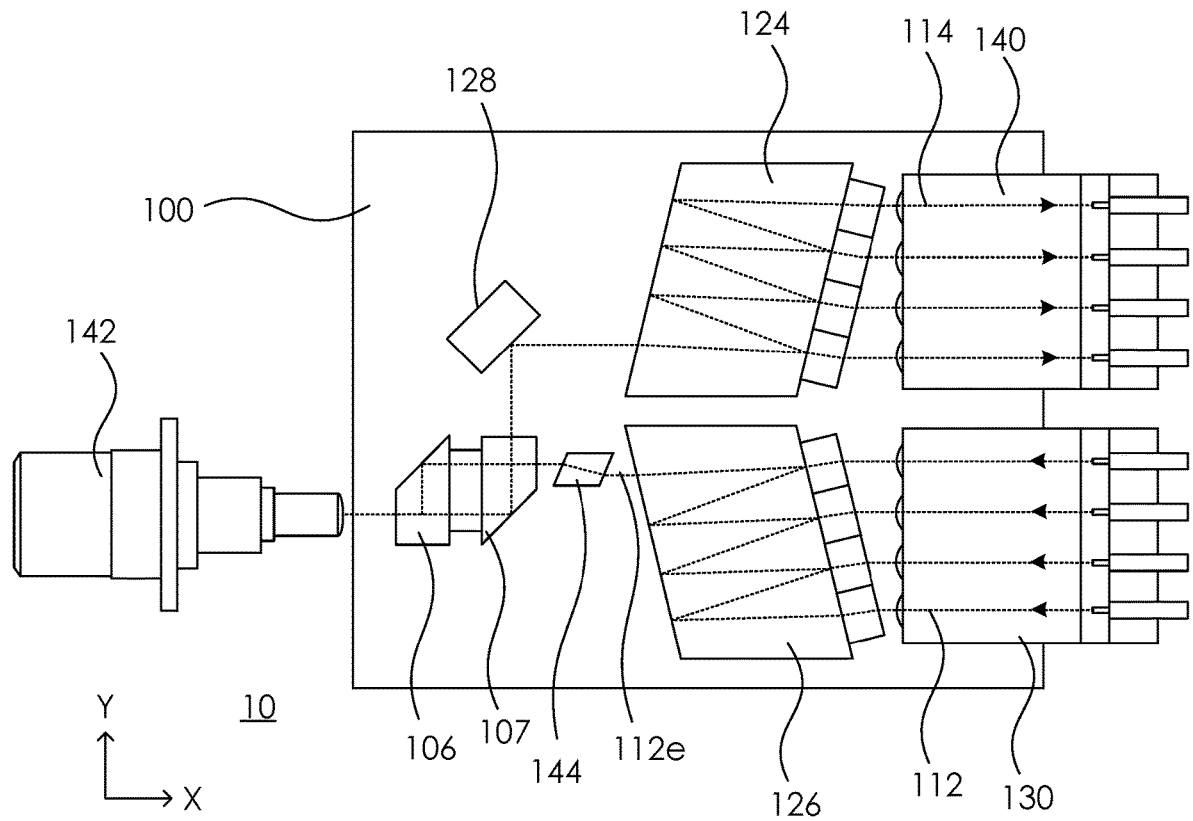
FIG. 9A illustrates a top view of an optical module according to some embodiments of the present disclosure.
Figure 9B:
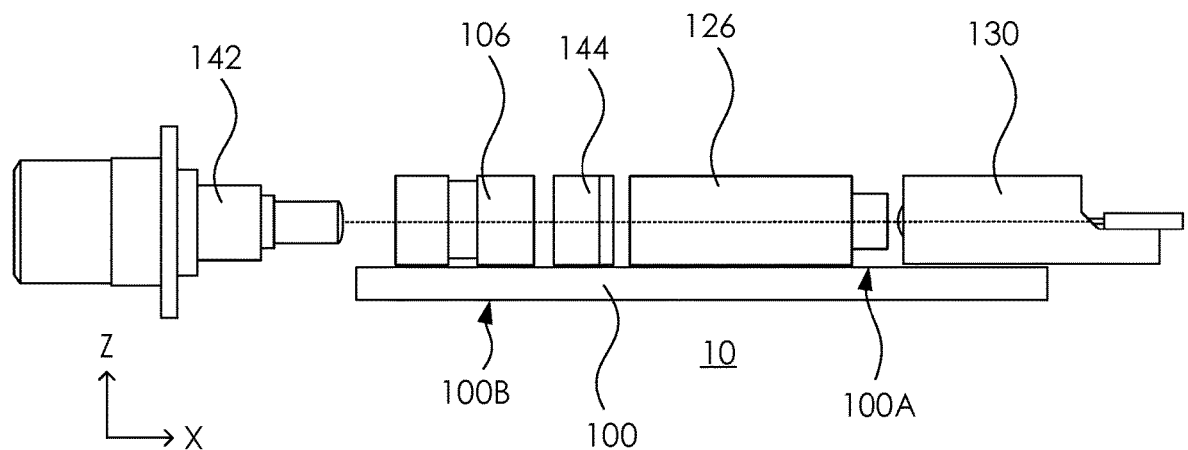
FIG. 9B illustrates a side view of an optical module according to some embodiments of the present disclosure.

Referring to FIGS. 9A and 9B, in some embodiments, the optical module 10 may further include an isolator core 144 between the circulator module 106 and the second Z-block 126. The isolator core 144 can be used to block the optical signal from the LC receptacle 142 (or the common terminal 108 in previous embodiments) that is not successfully reflected or refracted by the circulator module 106. That is, in the circumstances that the optical signal is leakage and is transmitted toward the second Z-block 126 instead of being transmitted toward the reflector portion 128 and toward the first Z-block 124 subsequently, the isolator core 144 can be used to block such light leakage. In contrast, in a reverse direction, the isolator core 144 would not block the multi-channel optical transmission signal 112e passing through to enter the circulator module 106. The input-output terminal of the optical module 10 can be substantially identical to that in the embodiments shown in FIGS. 7A and 7B, and omitted here for brevity.

In the present disclosure, there are a number of embodiments of optical modules that can provide the function in bi-directional monochromatic transmission. Overall, the input-output terminal that is coupled with the receiver (e.g., the PD) and the emitter (e.g., the LD) includes a plurality of types among the embodiments, wherein different types of the input-output terminal can be selected depending on the demand. For instance, in the circumstances that the emitter is a high-power laser diode, the collimator-array-structure of the input-output terminal can be applied to isolate the optical module from the unwanted heat energy. Furthermore, in the circumstances that the optical module is designed in a thin form, the input-output terminal can be provided in a separate structure that the input terminal (array) and the output terminal (array) can be laterally disposed on the substrate and aligned to different Z-blocks. Like the input-output terminal, there are different types of common terminals that can be selected, such as the collimator and the LC receptacle, depending on the install environment of the optical module. According to the present disclosure, it can be recognized that there are more optical module embodiments that can be achieved by using different combinations of the different types of the input-output terminal and the common terminal, and the circulator module and the MDM module therebetween. Since the principles and functions of these components are the same, other feasible embodiments of the optical modules are omitted here for brevity.

In one exemplary aspect, an optical module for bi-directional monochromatic transmission is provided. The optical module includes a substrate, a common terminal, a circulator module, a multiplex-demultiplex (MDM) module, and an input-output terminal. The common terminal is adjacent to the substrate and connected to an optical fiber. The circulator module is on the substrate and in free space optical communication with the common terminal The MDM module is on the substrate and in free space optical communication with the circulator. The input-output terminal is on the substrate and in free space optical communication with the MDM module, the input-output terminal being configured to connect to an emitter and a receiver. The circulator is configured to spatially separate a first directional transmission to the MDM module from a second directional transmission from the MDM module.

In another exemplary aspect, an optical module for bi-directional monochromatic transmission is provided. The optical module includes a substrate, a common terminal, a circulator module, a multiplex-demultiplex (MDM) module, and an input-output terminal. The substrate includes a multi-level structure. The common terminal is disposed adjacent to the substrate and connected to an optical fiber. The circulator module is disposed on the substrate and in free space optical communication with the common terminal. The MDM module is disposed on the substrate and in free space optical communication with the circulator module. The input-output terminal is disposed on the substrate and in free space optical communication with the MDM module. The input-output terminal is configured to connect to an emitter and a receiver. The circulator module is free from leveled with the MDM module.

In yet another exemplary aspect, an optical module for bi-directional monochromatic transmission is provided. The optical module includes a substrate, a common terminal, a circulator module, a multiplex-demultiplex (MDM) module, and an input-output terminal. The common terminal is disposed adjacent to the substrate and connected to an optical fiber. The circulator module is disposed on the substrate and in free space optical communication with the common terminal. The MDM module is disposed on the substrate and in free space optical communication with the circulator module. The input-output prism is disposed on the substrate and in free space optical communication with the MDM module, the input-output prism being configured to establish optical communication between the MDM module and an emitter or a receiver outside of the optical module.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical module for bi-directional monochromatic transmission, comprising:
   a substrate;
   a common terminal adjacent to the substrate and connected to an optical fiber;
   a circulator module on the substrate and in free space optical communication with the common terminal;
   a multiplex-demultiplex (MDM) module on the substrate and in free space optical communication with the circulator module; and
   an input-output terminal on the substrate and in free space optical communication with the MDM module, the input-output terminal being configured to connect to an emitter and a receiver,
   wherein the circulator module is configured to spatially separate a first directional transmission to the MDM module from a second directional transmission from the MDM module, and the circulator module comprises a circulator portion and a reflector portion optically coupled to the circulator portion.

2. The optical module of claim 1, wherein the input-output terminal comprises a first right angle prism configured to refract the first directional transmission prior to entering the receiver and the second directional transmission after transmitting from the emitter.

3. The optical module of claim 2, wherein the input-output terminal further comprises a second right angle prism in contact with the first right angle prism.

4. The optical module of claim 1, wherein the circulator module is configured to spatially separate a first directional transmission to the MDM module and a second directional transmission from the MDM module on a plane parallel to the substrate.

5. The optical module of claim 4, wherein the substrate comprises a multi-level structure, and wherein the input-output terminal is laterally leveled with the MDM module.

6. The optical module of claim 5, wherein the circulator module and the common terminal are disposed at a level of the multi-level structure different from that of the MDM module.

7. The optical module of claim 1, wherein the circulator module is configured to spatially separate a first directional transmission to the MDM module from a second directional transmission from the MDM module on a plane perpendicular to the substrate.

8. The optical module of claim 7, wherein the input-output terminal further comprises an input terminal and an output terminal in laterally disposed on the substrate.

9. The optical module of claim 8, wherein the output terminal comprises the first right angle prism, and the input terminal comprises a rhomboid prism.

10. The optical module of claim 8, wherein the MDM module comprises a first Z-block in free space optical communication with the input terminal and a second Z-block in free space optical communication with the output terminal, and wherein the first Z-block is in mirror symmetry with respect to the second Z-block.

11. The optical module of claim 1, wherein the reflector portion is disposed on the substrate and in free space optical communication with the first Z-block and the circulator portion.

12. An optical module for bi-directional monochromatic transmission, comprising:
    a substrate comprising a multi-level structure;
    a common terminal adjacent to the substrate and connected to an optical fiber;
    a circulator module on the substrate and in free space optical communication with the common terminal;
    a multiplex-demultiplex (MDM) module on the substrate and in free space optical communication with the circulator module; and
    an input-output terminal on the substrate and in free space optical communication with the MDM module, the input-output terminal being configured to connect to an emitter and a receiver,
    wherein the circulator module and the MDM module are at different levels of the substrate.

13. The optical module of claim 12, wherein the circulator module is configured to cause vertical spatial separation to a first directional transmission to the MDM module from a second directional transmission from the MDM module.

14. The optical module of claim 12, wherein the circulator module and the input-output terminal are at different levels of the substrate.

15. The optical module of claim 12, wherein the input-output terminal is further in optical communication with the receiver and the emitter at a same side of the input-output terminal.

16. The optical module of claim 12, wherein the input-output terminal is further in optical communication with the receiver and the emitter at different sides of the input-output terminal.

17. The optical module of claim 12, wherein the input-output terminal comprises a first terminal array coupled to the emitter and a second terminal array coupled to the receiver and vertically stacked over the first terminal layer.

18. An optical module for bi-directional monochromatic transmission, comprising:
- a substrate;
- a common terminal adjacent to the substrate and connected to an optical fiber;
- a circulator module on the substrate and in free space optical communication with the common terminal;
- a multiplex-demultiplex (MDM) module on the substrate and in free space optical communication with the circulator module; and
- an input-output prism on the substrate and in free space optical communication with the MDM module, the input-output prism being configured to establish optical communication between the MDM module and an emitter or a receiver outside of the optical module;
- wherein the input-output prism comprises a right angle prism structure configured to refract a first directional transmission prior to entering the receiver and a Rhomboid prism configured to refract a second directional transmission after transmitting from the emitter.

19. The optical module of claim 18, wherein a material of the right angle prism structure and a material of the Rhomboid prism are the same.

20. The optical module of claim 18, wherein the input-output prism and the circulator module are at different levels of the substrate.

* * * * *